United States Patent
Lustig

(10) Patent No.: US 12,360,222 B2
(45) Date of Patent: *Jul. 15, 2025

(54) SYSTEMS, APPARATUSES AND METHODS FOR CALIBRATING LiDAR SENSORS OF A ROBOT USING INTERSECTING LiDAR SENSORS

(71) Applicant: Brain Corporation, San Diego, CA (US)

(72) Inventor: Ryan Lustig, San Diego, CA (US)

(73) Assignee: Brain Corporation, San Diego, CA (US)

(*) Notice: Subject to any disclaimer, the term of this patent is extended or adjusted under 35 U.S.C. 154(b) by 368 days.

This patent is subject to a terminal disclaimer.

(21) Appl. No.: 17/870,745

(22) Filed: Jul. 21, 2022

(65) Prior Publication Data

US 2022/0365192 A1 Nov. 17, 2022

Related U.S. Application Data

(63) Continuation of application No. PCT/US2021/014313, filed on Jan. 21, 2021.

(60) Provisional application No. 62/964,698, filed on Jan. 23, 2020.

(51) Int. Cl.
*G01S 7/497* (2006.01)
*G01S 17/89* (2020.01)

(52) U.S. Cl.
CPC .............. *G01S 7/497* (2013.01); *G01S 17/89* (2013.01)

(58) Field of Classification Search
CPC ........ G01S 17/875; G01S 17/88; G01S 17/89; G01S 7/497; G05D 1/242; G05D 2109/10; G05D 2111/17

USPC .......................................................... 356/6
See application file for complete search history.

(56) References Cited

U.S. PATENT DOCUMENTS

| | | | |
|---|---|---|---|
| 9,052,721 B1 | 6/2015 | Dowdall et al. | |
| 9,297,899 B2 | 3/2016 | Newman et al. | |
| 10,509,983 B2 | 12/2019 | Sasaki et al. | |
| 2010/0235129 A1* | 9/2010 | Sharma | G01S 17/86 702/97 |
| 2019/0120947 A1 | 4/2019 | Wheeler et al. | |
| 2023/0120781 A1* | 4/2023 | Lustig | G01S 17/89 700/258 |

FOREIGN PATENT DOCUMENTS

WO 20200010043 A1 1/2020

OTHER PUBLICATIONS

International Search Report and Written Opinion for PCT/US21/14313 dated Mar. 31, 2021.

* cited by examiner

*Primary Examiner* — Tri T Ton
(74) *Attorney, Agent, or Firm* — Pierson Ferdinand LLP; Sidharth Kapoor

(57) ABSTRACT

Systems, apparatuses, and methods for calibrating LiDAR sensors of a robot using intersecting LiDAR sensors are disclosed herein. According to at least one non-limiting exemplary embodiment, a robot may calibrate a calibration LiDAR based on a determined pose of the calibration LiDAR, wherein the pose is determined based on a measurement error between the calibration LiDAR and an intersecting reference LiDAR.

15 Claims, 13 Drawing Sheets

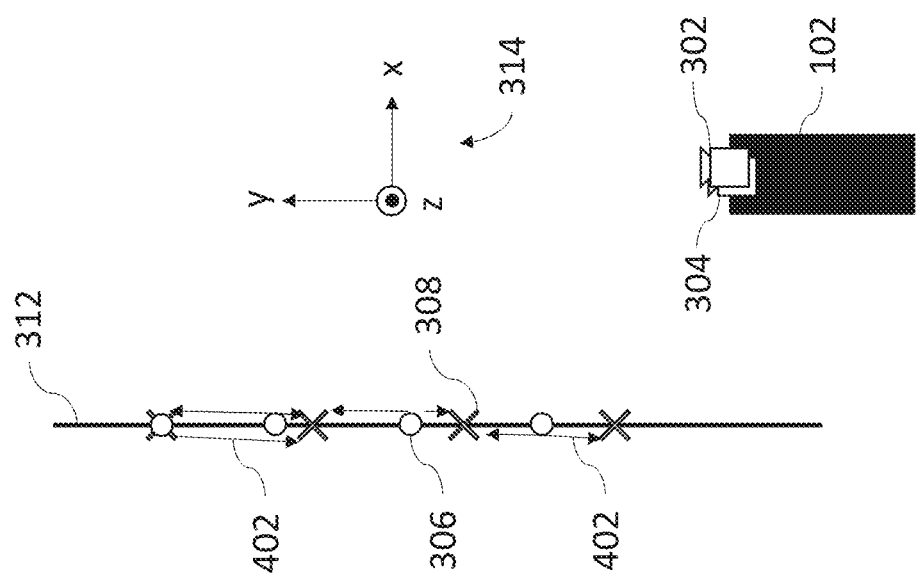

| Calibration LiDAR measurements | Reference LiDAR measurements | Error |
|---|---|---|
| ... | ... | ... |
| $(X_1, Y_1, Z_1)$ | $(X_a, Y_a, Z_a)$ | $E_1$ |
| $(X_2, Y_2, Z_2)$ | $(X_b, Y_b, Z_b)$ | $E_2$ |
| $(X_3, Y_3, Z_3)$ | $(X_c, Y_c, Z_c)$ | $\sqrt{(X_3-X_b)^2+(Y_3-Y_b)^2} + \sqrt{(X_3-X_c)^2+(Y_3-Y_c)^2} = E_3$ |
| $(X_4, Y_4, Z_4)$ | $(X_d, Y_d, Z_d)$ | $\sqrt{(X_4-X_c)^2+(Y_4-Y_c)^2} + \sqrt{(X_4-X_d)^2+(Y_4-Y_d)^2} = E_4$ |
| $(X_5, Y_5, Z_5)$ | $(X_e, Y_e, Z_e)$ | $\sqrt{(X_5-X_d)^2+(Y_5-Y_d)^2} + \sqrt{(X_5-X_e)^2+(Y_5-Y_e)^2} = E_5$ |
| $(X_6, Y_6, Z_6)$ | $(X_f, Y_f, Z_f)$ | $\sqrt{(X_6-X_e)^2+(Y_6-Y_e)^2} + \sqrt{(X_6-X_f)^2+(Y_6-Y_f)^2} = E_6$ |
| $(X_7, Y_7, Z_7)$ | $(X_g, Y_g, Z_g)$ | $E_7$ |
| $(X_8, Y_8, Z_8)$ | $(X_h, Y_h, Z_h)$ | $E_8$ |
| ... | ... | ... |

404

406 — Error Measurement

FIG. 4C

US 12,360,222 B2

SYSTEMS, APPARATUSES AND METHODS FOR CALIBRATING LiDAR SENSORS OF A ROBOT USING INTERSECTING LiDAR SENSORS

PRIORITY

This is a continuation application of International Patent Application No. PCT/US2021/014313, filed Jul. 21, 2021 and claims the benefit of U.S. Provisional Patent Application Ser. No. 62/964,698 filed on Jan. 23, 2020 under 35 U.S.C. § 119, the entire disclosure of each is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems, apparatuses, and methods for calibrating LiDAR sensors of a robot using intersecting LiDAR sensors.

SUMMARY

The foregoing needs are satisfied by the present disclosure, which provides for, inter alia, systems and methods for calibrating LiDAR sensors of a robot using intersecting LiDAR sensors.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a non-transitory computer readable memory comprising a plurality of instructions stored thereon is disclosed. The non-transitory computer readable memory comprises instructions to configure a specialized processing device to collect groups of scans comprising scan data from a calibration LiDAR and a reference LiDAR, the calibration LiDAR being a LiDAR sensor to be calibrated and the reference LiDAR being a well calibrated LiDAR sensor; determine a pose of the calibration LiDAR based on the scan data within the groups; and adjust data or mountings of the calibration LiDAR based on the determined pose of the calibration LiDAR. The computer readable instructions may further configure the specialized processing device to impose a selection threshold to ensure measurements used to determine an intersection between the calibration LiDAR and reference LiDAR lies within a substantially flat surface orthogonal to a measurement lane of the reference LiDAR. Additionally, the computer readable instructions may further configure the specialized processing device to discard any determined poses not meeting a specification threshold, wherein the discarded poses may comprise improbable poses of the calibration LiDAR based on physical constraints.

According to at least one non-limiting exemplary embodiment, a method for calibrating a calibration LiDAR sensor is disclosed. The method comprises collecting a group of scans from a calibration LiDAR and an intersecting reference LiDAR. The group of scans may then be utilized to determine an error measurement based on discrepancies in localization of a flat surface orthogonal to a measurement plane of the reference LiDAR. The method further comprises minimizing the error measurement to determine a pose of the calibration LiDAR, wherein the determined pose may be used to adjust data from the calibration LiDAR or adjust a mount of the calibration LiDAR.

According to at least one non-limiting exemplary embodiment, a robotic system is disclosed. The system comprises a non-transitory computer readable memory and at least one specialized processing device configurable to execute instructions stored on the non-transitory computer readable memory to cause the at least one specialized processing device to: collect a plurality of scans from a calibration LiDAR and a reference LiDAR, determine a pose of the calibration LiDAR based on errors measured between localization of a flat surface between the calibration LiDAR and reference LiDAR, and adjust data or mounting of the calibration LiDAR based on the determined pose.

According to at least one non-limiting exemplary embodiment, the surface includes a vertical wall.

According to at least one non-limiting exemplary embodiment further comprising instructions which configure the at least one processor to digitally adjust the data arriving from the calibration LiDAR based on a difference between the pose and a default pose of the calibration LiDAR.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 4B is a top view of a robot collecting measurements from a calibration LiDAR and a reference LiDAR to illustrate a calibrated calibration LiDAR sensor generating a minimized error measurement, according to an exemplary embodiment.

FIG. 4C is a data table comprising a plurality of calibration LiDAR measurements and reference LiDAR measurements used to determine an error measurement, according to an exemplary embodiment.

Figure 1A:
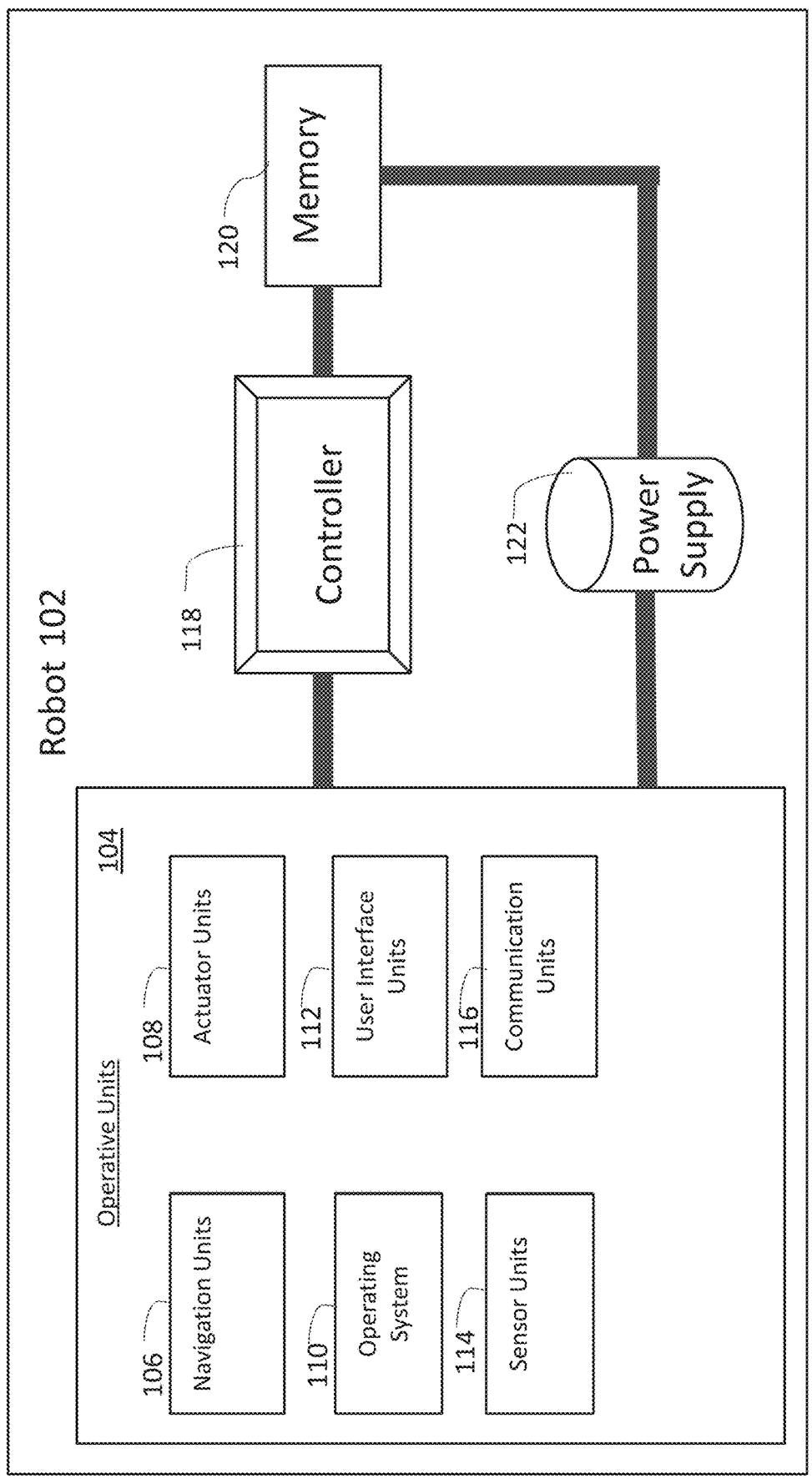
FIG. 1A is a functional block diagram of a main robot in accordance with some exemplary embodiments of this disclosure.

All Figures disclosed herein are © Copyright 2021 Brain Corporation. All rights reserved.

DETAILED DESCRIPTION

Currently, robots may comprise a plurality of light detection and ranging (LiDAR) sensors configurable to collect distance measurements between a LiDAR sensor and nearby objects. Each of these LiDAR sensors may be mounted on a robot at a pose determined by the manufacturer of the robot. Often, some LiDAR sensors of a robot may intersect to provide a robot with ample coverage of its surroundings.

Over time, these LiDAR sensors may shift their pose due to a plurality of factors causing the LiDAR sensors to become uncalibrated. Uncalibrated LiDAR sensors may impede the ability of a robot to perform functions and navigate its surrounding environment accurately. An operator may be required to individually calibrate each LiDAR sensor if the LiDAR sensors become uncalibrated.

Accordingly, there is a need in the art for systems and methods for calibrating LiDAR sensors of a robot using intersecting LiDAR sensors as these systems and methods may enable a robot to calibrate its own LiDAR sensors without the need for a human operator.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods for calibrating LiDAR sensors of a robot using intersecting LiDAR sensors.

As used herein, a robot may include mechanical and/or virtual entities configurable to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything from one location to another.

As used herein, a pose of a LiDAR sensor may comprise an orientation (yaw, pitch, roll) and translational position (x, y, z) of the LiDAR sensor.

As used herein, a reference LiDAR may comprise a LiDAR sensor considered to be well calibrated. Measurements from the reference LiDAR may be used by a controller of a robot to determine a pose of a calibration LiDAR using the systems and methods of the present disclosure.

As used herein, a default pose or position of a sensor on a robot corresponds to a well-calibrated pose of that sensor on the robot. Default poses may be specified by, e.g., a manufacturer or designer of the robot 102. If a sensor is in any pose different from the default pose, the sensor may be considered "uncalibrated" or "poorly calibrated" and corrected using the systems and methods disclosed herein. In some instances, a sensor may be in a pose different from its default pose while being well calibrated if the data from the sensor is digitally manipulated to cause the data to appear as if it were gathered from a well calibrated sensor. For example, a robot may include a sensor whose pose deviates from the default pose by ($\Delta$, 0, 0) along (x, y z) axis. An object localized at (x, 0, 0) by the poorly calibrated sensor may be digitally moved to (x−$\Delta$, 0, 0) to account for the error in pose of the sensor without having to physically adjust the sensor itself.

As used herein, a calibration LiDAR comprises a LiDAR sensor which may be uncalibrated, wherein the calibration of the calibration LiDAR is performed using measurements from a reference LiDAR using the systems and methods of the present disclosure. To calibrate the calibration LiDAR a pose of the calibration LiDAR may be determined, wherein a controller of a robot may adjust data from or a mounting of the calibration LiDAR based on the determined pose of the calibration LiDAR. Both the calibration LiDAR and reference LiDAR collect measurements along one or more measurement planes, wherein the measurement planes of both LiDAR sensors intersect, as illustrated below in FIG. 3.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processing device, microprocessor, and/or digital processing device may include any type of digital processing device such as, without limitation, digital signal processors ("DSPs"), reduced instruction set computers ("RISC"), complex instruction set computers ("CISC"), microprocessing devices, microprocessors, gate arrays (e.g., field programmable gate arrays ("FPGAs")), programmable logic device ("PLDs"), reconfigurable computer fabrics ("RCFs"), array processing devices, array processor, secure microprocessing devices, specialized processors (e.g., neuromorphic processors), and application-specific integrated circuits ("ASICs"). Such digital processing devices may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like. These examples are non-limiting and as such computer program and/or software may be rendered in any programming language or environment as one of skill in the art would appreciate.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) allow robots to calibrate their sensors without the need for a human operator; (ii) allow robots to calibrate their sensors in real time while operating; (iii) reduce time spent calibrating LiDAR sensors of a robot; and (iv) enhance the ability of a robot to rely on sensor data for navigation thereby enhancing the autonomy of the robot. Other advantages are readily discernable by one having ordinary skill in the art given the contents of the present disclosure.

According to at least one non-limiting exemplary embodiment, a non-transitory computer readable memory comprising a plurality of instructions stored thereon is disclosed. The non-transitory computer readable memory comprises instructions to configure a specialized processing device to collect groups of scans comprising scan data from a calibration LiDAR and a reference LiDAR, the calibration LiDAR being a LiDAR sensor to be calibrated and the reference LiDAR being a well calibrated LiDAR sensor; determine a pose of the calibration LiDAR based on the scan data within the groups; and adjust data or mountings of the calibration LiDAR based on the determined pose of the calibration LiDAR. The computer readable instructions may further configure the specialized processing device to impose a selection threshold to ensure measurements used to determine an intersection between the calibration LiDAR and reference LiDAR lies within a substantially flat surface orthogonal to a measurement lane of the reference LiDAR. Additionally, the computer readable instructions may further configure the specialized processing device to discard any determined poses not meeting a specification threshold, wherein the discarded poses may comprise improbable poses of the calibration LiDAR based on physical constraints.

According to at least one non-limiting exemplary embodiment, a method for calibrating a calibration LiDAR sensor is disclosed. The method comprises collecting a group of scans from a calibration LiDAR and an intersecting reference LiDAR. The group of scans may then be utilized to determine an error measurement based on discrepancies in localization of a flat surface orthogonal to a measurement plane of the reference LiDAR. The method further comprises minimizing the error measurement to determine a pose of the calibration LiDAR, wherein the determined pose may be used to adjust data from the calibration LiDAR or adjust a mount of the calibration LiDAR.

According to at least one non-limiting exemplary embodiment, a robotic system is disclosed. The system comprises a non-transitory computer readable memory and at least one specialized processing device configurable to execute instructions stored on the non-transitory computer readable memory to cause the at least one specialized processing device to: collect a plurality of scans from a calibration LiDAR and a reference LiDAR, determine a pose of the calibration LiDAR based on errors measured between localization of a flat surface between the calibration LiDAR and reference LiDAR, and adjust data or mounting of the calibration LiDAR based on the determined pose.

According to at least one non-limiting exemplary embodiment, the surface includes a vertical wall.

According to at least one non-limiting exemplary embodiment further comprising instructions which configure the at least one processor to digitally adjust the data arriving from the calibration LiDAR based on a difference between the pose and a default pose of the calibration LiDAR.

FIG. 1A is a functional block diagram of a robot 102 in accordance with some exemplary embodiments of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processing devices (e.g., microprocessors) and other peripherals. As previously mentioned and used herein, processing device, microprocessor, and/or digital processor may include any type of digital processing device such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processing devices, array processors, secure microprocessing devices, specialized processors (e.g., neuromorphic processors), and application-specific integrated circuits ("ASICs"). Such digital processing devices may be contained on a single unitary integrated circuit die, or distributed across multiple components.

Controller 118 may be operatively and/or communicatively coupled to memory 120. Memory 120 may include any type of integrated circuit or other storage device configurable to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configurable to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processing device may be external to robot 102 and be communicatively coupled to controller 118 of robot 102 utilizing communication units 116 wherein the external processing device may receive data from robot 102, process the data, and transmit computer-readable instructions back to controller 118. In at least one non-limiting exemplary embodiment, the processing device may be on a remote server (not shown).

In some non-limiting exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configurable to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In the non-limiting exemplary embodiments, at least a portion of the library may be stored on a network (e.g., cloud, server, distributed network, etc.) and/or may not be stored completely within memory 120. As yet another non-limiting exemplary embodiment, various robots (e.g., that are commonly associated, such as robots by a common manufacturer, user, network, etc.) may be networked so that data captured by individual robots are collectively shared with other robots. In such a fashion, these robots may be configurable to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processing devices. In some embodiments, a single controller (e.g., controller 118) may serve as the various controllers and/or processing devices described. In other embodiments different controllers and/or processing devices may be used, such as controllers and/or processing devices used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configurable to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configurable to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators may actuate the wheels for robot 102 to navigate a route; navigate around obstacles; rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to non-limiting exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to non-limiting exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to non-limiting exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on measurements. Such data may be stored in data structures, such as matrices, arrays, queues, lists, arrays, stacks, bags, etc. According to non-limiting exemplary embodiments, the data structure of the sensor data may be called an image.

According to non-limiting exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configurable to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to non-limiting exemplary embodiments, the data structure of the sensor data may be called an image.

According to non-limiting exemplary embodiments, user interface units 112 may be configurable to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to non-limiting exemplary embodiments user interface units 112 may be positioned on the body of robot 102. According to non-limiting exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to non-limiting exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to non-limiting exemplary embodiments, communications unit 116 may include one or more receivers, transmitters, and/or transceivers. Communications unit 116 may be configurable to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/ 802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configurable to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configurable to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configurable to send and receive statuses, commands, and other data/information. For example, communications unit 116 may communicate with a user operator to allow the user to control robot 102. Communications unit 116 may communicate with a server/ network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In non-limiting exemplary embodiments, operating system 110 may be configurable to manage memory 120, controller 118, power supply 122, modules in operative units 104, and/or any software, hardware, and/or features of robot 102. For example, and without limitation, operating system 110 may include device drivers to manage hardware recourses for robot 102.

In non-limiting exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to non-limiting exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processing device, or robot performing a task illustrated in the figures below comprises a controller executing computer readable instructions stored on a non-transitory computer readable storage apparatus, such as memory 120, as would be appreciated by one skilled in the art.

Figure 1B:
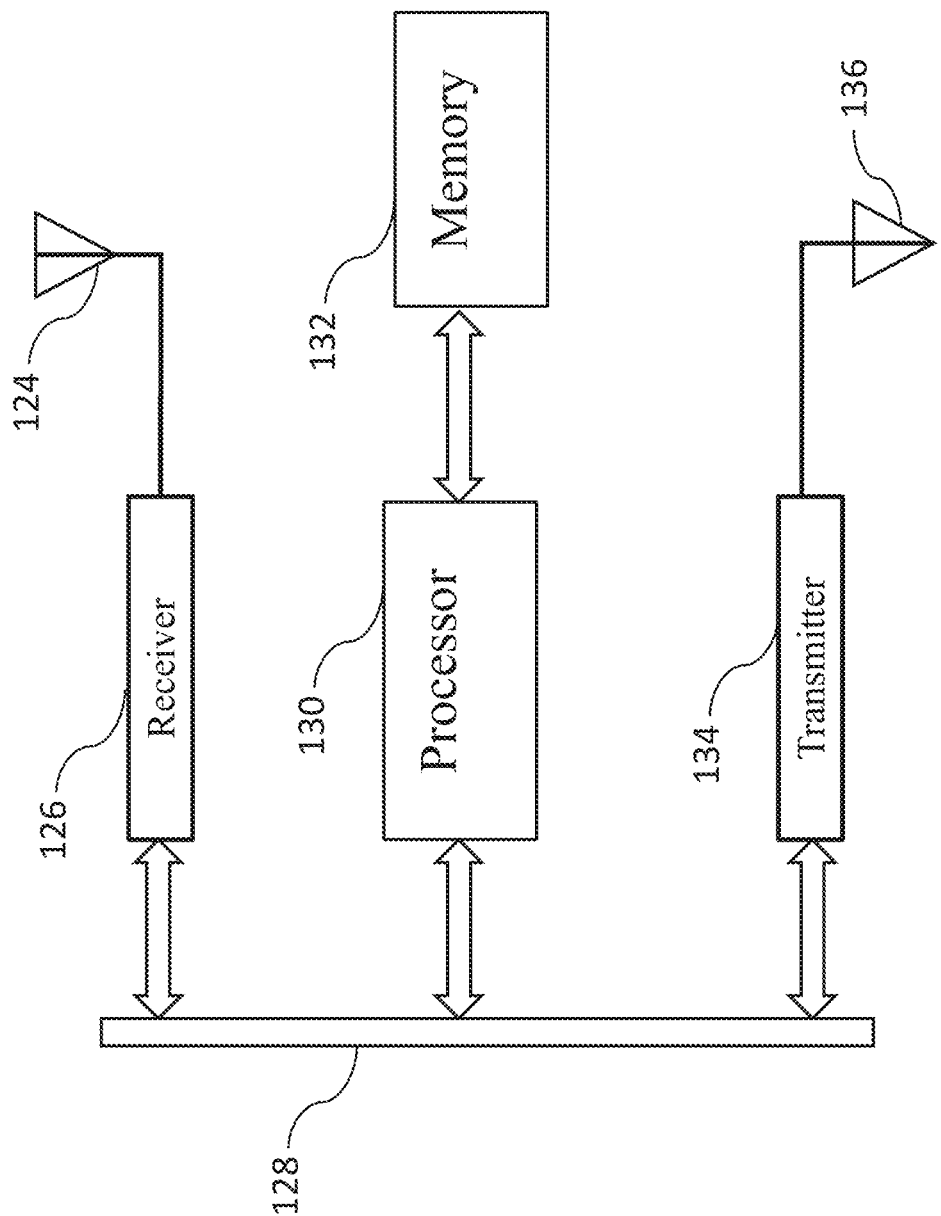
FIG. 1B is a functional block diagram of a controller or processing device in accordance with some exemplary embodiments of this disclosure.

Next referring to FIG. 1B, the architecture of the specialized controller 118 used in the system shown in FIG. 1A is illustrated according to a non-limiting exemplary embodiment. As illustrated in FIG. 1B, the specialized computer includes a data bus 128, a receiver 126, a transmitter 134, at least one processing device 130, and a memory 132. The receiver 126, the processing device 130 and the transmitter 134 all communicate with each other via the data bus 128. The processing device 130 is a specialized processing device configurable to execute specialized algorithms. The processing device 130 is configurable to access the memory 132 which stores computer code or instructions in order for the processing device 130 to execute the specialized algorithms. As illustrated in FIG. 1B, memory 132 may comprise some, none, different, or all of the features of memory 124 previously illustrated in FIG. 1A. The algorithms executed by the processing device 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processing device 130 via the data bus 128. As one skilled in the art would appreciate, the data bus 128 is the means of communication between the different components— receiver, processing device, and transmitter—in the specialized controller 118. The processing device 130 executes the algorithms, as discussed below, by accessing specialized computer-readable instructions from the memory 132. Further detailed description as to the processing device 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, non-volatile, dynamic, static, read/write, read-only, random-access, sequential-access, location-addressable, file-addressable, and/or content-addressable devices. The processing device 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may illustrate an external cloud server architecture configurable to effectuate the control of a robotic apparatus from a remote location. That is, the cloud server may also include a data bus, a receiver, a transmitter, a processing device, and a memory that stores specialized computer readable instructions thereon.

Figure 2:
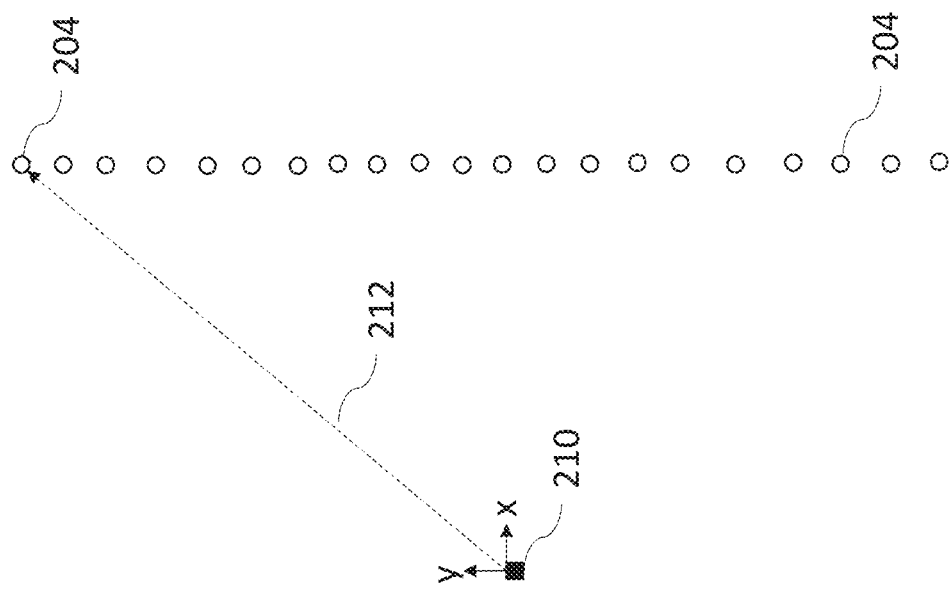
FIG. 2(i-ii) is a light detection and ranging (LiDAR) sensor and features thereof in accordance with some exemplary embodiments of this disclosure.
Figure 2I:
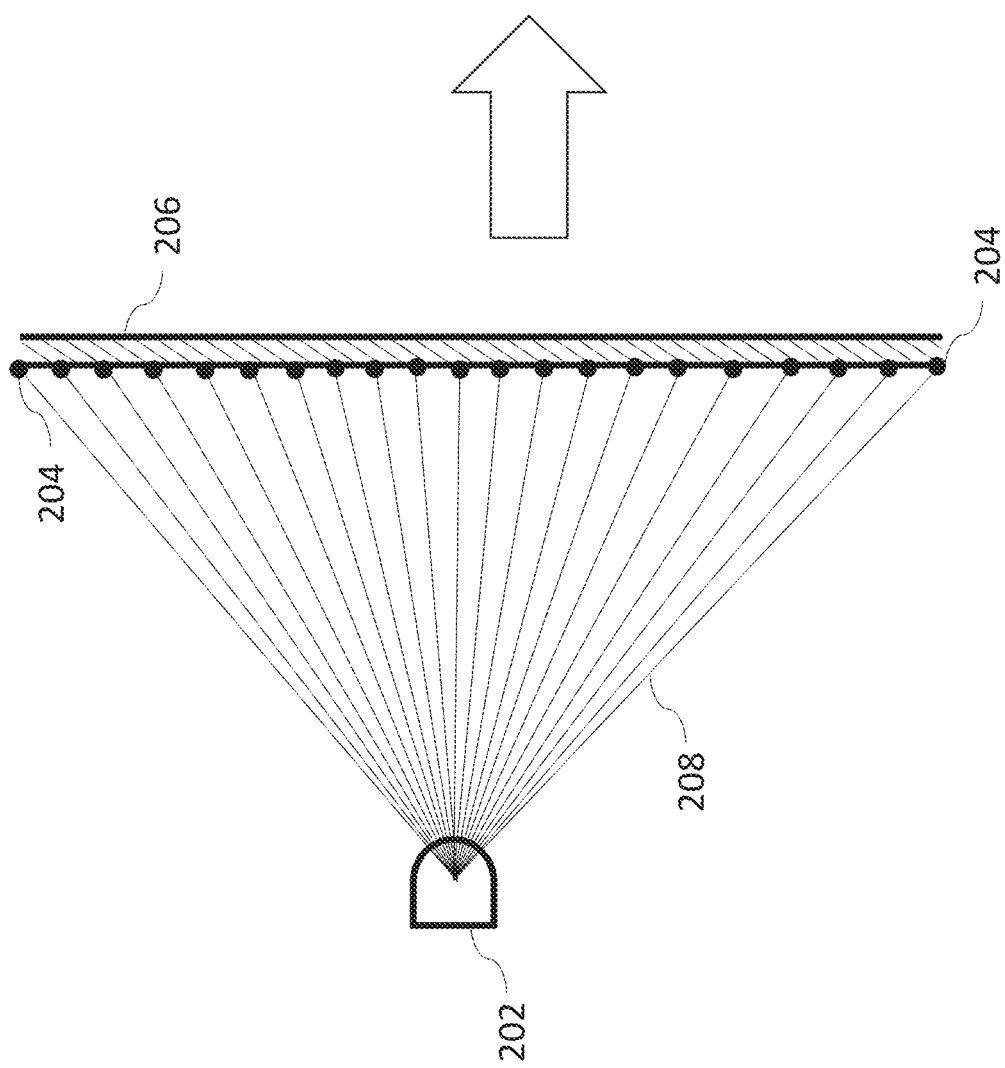

FIG. 2(*i-ii*) illustrates a planar light detection and ranging ("LiDAR") sensor 202 coupled to a robot 102, which collects distance measurements to a wall 206 along a measurement plane in accordance with some exemplary embodiments of the present disclosure. Planar LiDAR sensor 202, illustrated in FIG. 2(*i*), may be configured to collect distance measurements to the wall 206 by projecting a plurality of beams 208 of photons at discrete angles along a measurement plane and determining the distance to the wall 206 based on a time of flight ("ToF") of the photons leaving the LiDAR sensor 202, reflecting off the wall 206, and returning back to the LiDAR sensor 202. The measurement plane of the planar LiDAR 202 comprises a plane along which the beams 208 are emitted which, for this exemplary embodiment illustrated, is the plane of the page.

Individual beams 208 of photons may localize respective points 204 of the wall 206 in a point cloud, the point cloud comprising a plurality of points 204 localized in 2D or 3D space as illustrated in FIG. 2(*ii*). The points 204 may be defined about a local origin 210 of the sensor 202. Distance 212 to a point 204 may comprise half the time of flight of a photon of a respective beam 208 used to measure the point 204 multiplied by the speed of light, wherein coordinate values (x, y) of each respective point 204 depends both on distance 212 and an angle at which the respective beam 208 was emitted from the sensor 202. The local origin 210 may comprise a predefined point of the sensor 202 to which all distance measurements are referenced (e.g., location of a detector within the sensor 202, focal point of a lens of sensor 202, etc.). For example, a 5-meter distance measurement to an object corresponds to 5 meters from the local origin 210 to the object.

According to at least one non-limiting exemplary embodiment, sensor 202 may be illustrative of a depth camera or other ToF sensor configurable to measure distance, wherein the sensor 202 being a planar LiDAR sensor is not intended to be limiting. Depth cameras may operate similar to planar LiDAR sensors (i.e., measure distance based on a ToF of beams 208); however, depth cameras may emit beams 208 using a single pulse or flash of electromagnetic energy, rather than sweeping a laser beam across a field of view. Depth cameras may additionally comprise a two-dimensional field of view rather than a one-dimensional, planar field of view.

According to at least one non-limiting exemplary embodiment, sensor 202 may be illustrative of a structured light LiDAR sensor configurable to sense distance and shape of an object by projecting a structured pattern onto the object and observing deformations of the pattern. For example, the size of the projected pattern may represent distance to the object and distortions in the pattern may provide information of the shape of the surface of the object. Structured light sensors may emit beams 208 along a plane as illustrated or in a predetermined pattern (e.g., a circle or series of separated parallel lines).

One skilled in the art would appreciate that a plurality of LiDAR sensors 202 may be positioned on a robot chassis 102 to enhance the navigation and localization capabilities of the robot 102. These LiDAR sensors 202 may be mounted in static positions (e.g., using screws, bolts, etc.) or may be mounted with servomotors configurable to adjust the pose of the LiDAR sensor if needed. Calibration of these LiDAR sensors 202 may be essential for a robot 102 to navigate through an environment safely and perform complex tasks accurately. Calibration of LiDAR sensors may degrade over time due to, for example, wear and tear, collisions with objects or people, and/or electrical components of the LiDAR performing abnormally due to temperature fluctuations.

Figure 3:
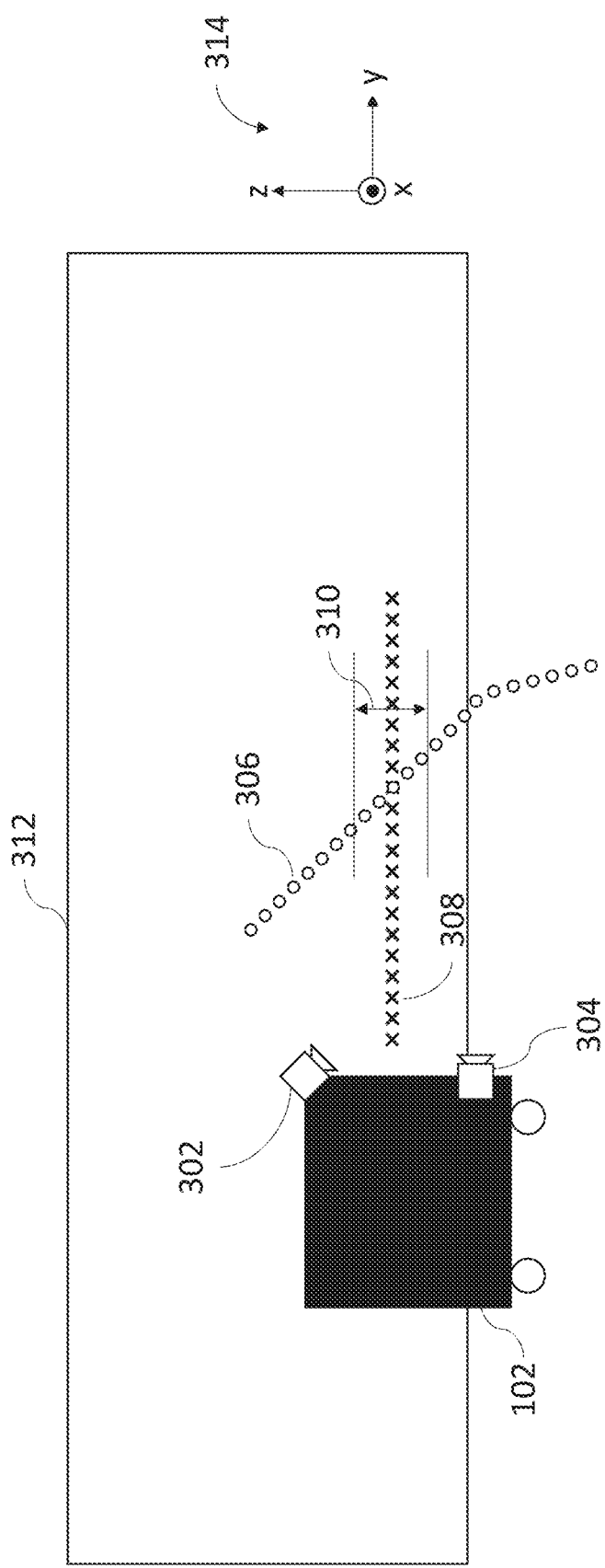
FIG. 3 is a side view of a robot collecting measurements from a calibration LiDAR and a reference LiDAR at an instance in time, according to an exemplary embodiment.

FIG. 3 illustrates a side view of a robot 102, comprising a calibration LiDAR 302 and a reference LiDAR 304, navigating nearby a wall 312, according to an exemplary embodiment. The calibration LiDAR 302 may comprise a LiDAR sensor to be calibrated based on measurements from the reference LiDAR 304, wherein the reference LiDAR 304 may be considered to be a well calibrated LiDAR sensor. For example, reference LiDAR 304 may be rigidly mounted such that the likelihood of the reference LiDAR 304 being poorly calibrated are low. The calibration LiDAR 302 generates a plurality of measurements 306, illustrated by circles, corresponding to locations where individual beams of the calibration LiDAR 302 contact the wall 312. Similarly, the reference LiDAR 304 generates measurements 308, illustrated by crosses, along the wall 312. Both the reference LiDAR 304 and calibration LiDAR 302 illustrated comprise planar LiDAR sensors collecting distance measurements along a measurement plane. The wall 312 illustrated comprises a substantially vertical wall with respect to a surface of which the robot 102 navigates. Measurements 306, 308 may be illustrative of the points 206 shown in FIG. 2(u) above.

Selection threshold 310 may be imposed by a controller 118 of the robot 102 to select measurements 306 of the calibration LiDAR 302 which lie within the selection threshold 310 to be used to determine a pose of the calibration LiDAR 302 using methods 500 and 600 illustrated below in FIGS. 5 and 6, respectively. The selection threshold 310 may be determined based on a deviation from the measurement plane of the reference LiDAR 304 (e.g., ±1 centimeters, ±3 centimeters, etc.) orthogonal to the measurement plane. For example, as illustrated, the selection threshold 310 may deviate from the X-Y plane of measurement of the reference LiDAR 304, as shown by reference coordinates 314, by two (2) centimeters along the Z-axis, thereby selecting points within two (2) centimeters above and below the X-Y plane. One skilled in the art would appreciate that a measurement plane for a reference LiDAR 304 may be along any plane of reference, wherein the selection threshold 310 deviating from the X-Y plane illustrated is not intended to be limiting.

Imposing a selection threshold 310 may enable a robot 102 to ensure the measurements 306 within the selection threshold 310 comprise measurements of a substantially flat and vertical surface of the wall 312. The robot 102 may collect a plurality of measurements 306 and 308 at discrete intervals in time as the robot 102 navigates nearby the wall 312, wherein the measurements 306 and 308 illustrated are measurements taken at a single instance in time.

According to at least one non-limiting exemplary embodiment, a reference LiDAR 304 may comprise a 3D LiDAR, wherein a selection threshold 310 may be determined based on a deviation from one plane of reference of the plurality of measurement planes of the 3D LiDAR. According to at least one non-limiting exemplary embodiment, a calibration LiDAR 302 may comprise a 3D LiDAR, wherein a selection threshold 310 may still be determined based on a deviation from a plane of reference of a reference LiDAR 304, however, a plurality of additional measurements 306 may be included within the selection threshold 310.

Figure 4A:
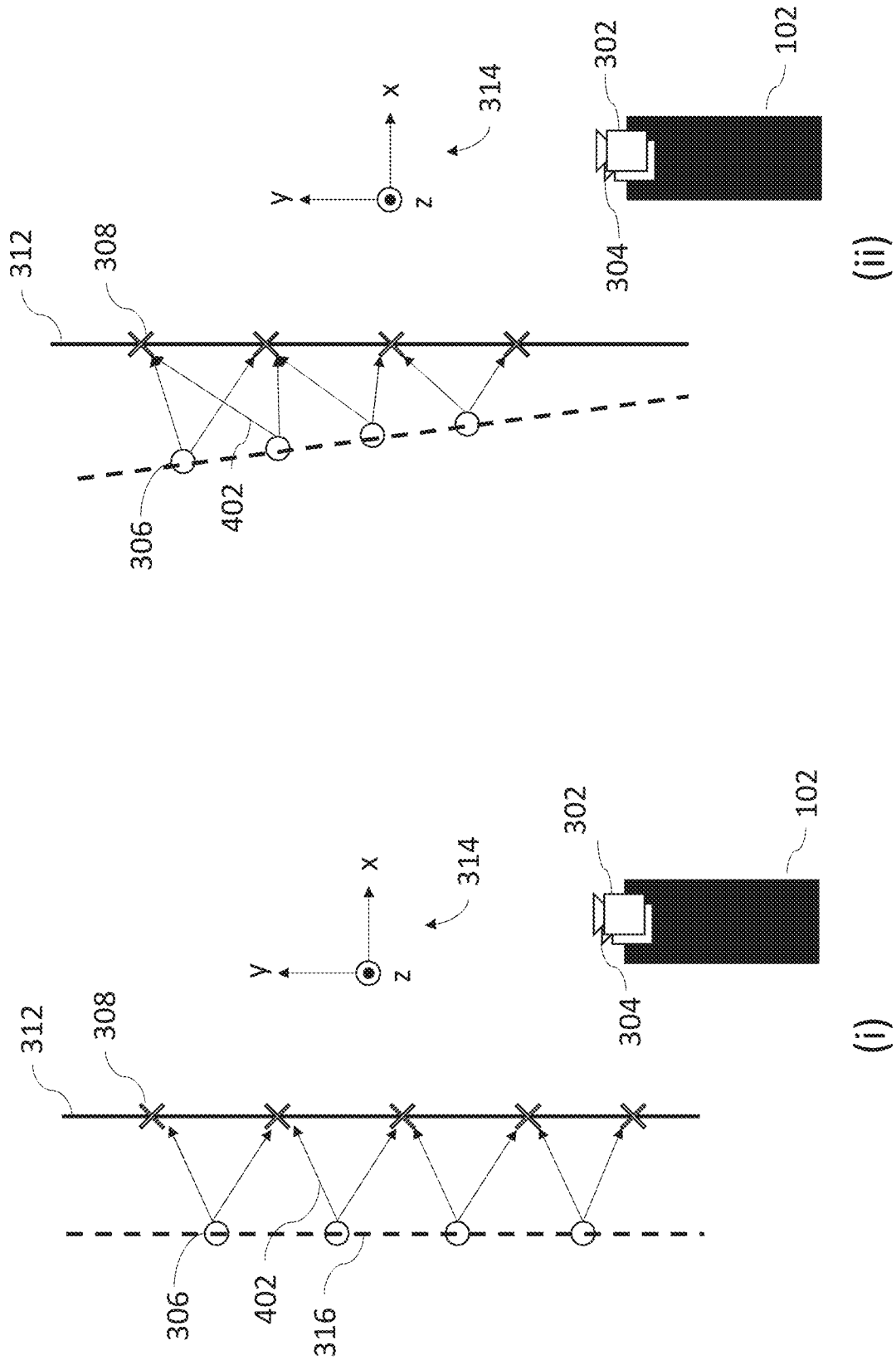
FIGS. 4A(i)-(iii) is a top view of a robot collecting measurements from a calibration LiDAR and a reference LiDAR to illustrate localization errors between the two LiDAR sensors, according to non-limiting exemplary embodiments.
Figure 4A:
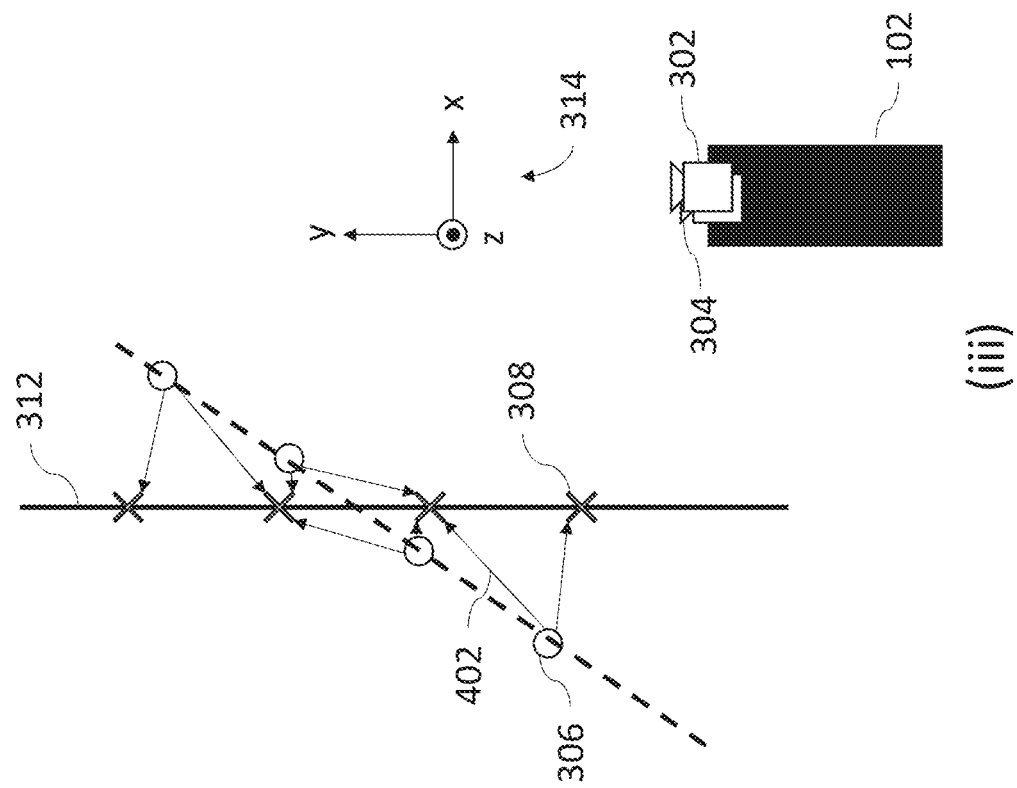

FIG. 4A generally illustrates a plurality of errors 402 measured due to incorrect positioning of a calibration LiDAR 302 with respect to its orientation (yaw, pitch, roll) and translation (x, y, z) projected onto a plane of reference of a reference LiDAR 304, according to non-limiting exemplary embodiments. The position of measurements 306 and 308 are illustrative of where the robot 102 localizes a wall 312 based on measurement data from a calibration LiDAR 302 and a reference LiDAR 304, respectively, presuming both LiDAR sensors 302, 304 are well-calibrated (i.e., presuming both LiDAR sensors 302, 304 are in their default positions). The measurements 306 and 308 are projected on a measurement plane of the reference LiDAR 304. Measurements 308 are measured by a reference LiDAR 304 considered to be well calibrated and measurements 306 are measured from a calibration LiDAR 302 which may not be well calibrated. Accordingly, localization of the wall 312 as illustrated is based on localization of the wall 312 by the reference LiDAR 304.

First, in FIG. 4A(i), measurement points 306 localizes the wall 312 beyond where measurement points 308 localize the wall 312 which may correspond to the calibration LiDAR 302 being mispositioned on the robot 102 along an X-axis, defined by reference coordinates 314 comprising the same reference coordinates illustrated in FIG. 3 above from a different perspective. The four measurement points 306 illustrated may have been determined to be measurement points 306 which lie within a selection threshold 310, illustrated above in FIG. 3. Errors 402 may be calculated between each measurement 306 and their closest two neighboring measurements 308. Errors 402 may be utilized in calculating an error measurement 406 using a $L_1$, $L_2$, root mean square (RMS), or other error measurement calculation based on a difference of X and Y coordinates of a measurement 306 and its closest neighboring measurements 308, as illustrated below in equation 1.

Next, FIG. 4A(ii) illustrates another exemplary embodiment illustrating a plurality of incorrect measurements 306, determined to lie within the selection threshold 310. The measurements 306 may be skewed with respect to the wall 312 axis, which follows a Y-axis as illustrated by the reference coordinates 314. This may be caused due to, for example, incorrect orientation and/or position of the calibration LiDAR 302 with respect to yaw, pitch, roll, x position, y position, z position, or a combination thereof. Accordingly, errors 402 may be calculated between each measurement 306 and their closest two neighboring measurements 308 as illustrated.

Lastly, FIG. 4A(iii) illustrates another exemplary embodiment of measurements 306, determined to lie within a selection threshold 310, skewed with respect to the axis of wall 312, which follows the Y axis as illustrated by the reference coordinates 314. The skew of the measurements 306 may be caused due to incorrect orientation of the calibration LiDAR 302 with respect to yaw, pitch, roll, or a combination thereof. Accordingly, errors 402 may be calculated between each measurement 306 and its closest two neighboring measurements 308 as illustrated.

According to at least one non-limiting exemplary embodiment, errors 402 may be calculated from each measurement point 306 to its closest three, or more, neighboring measurements 308.

One skilled in the art would appreciate that the measurements 306 illustrated in FIG. 4A may be caused by any orientation (yaw, pitch, roll) and/or translation (x, y, z) error of the calibration LiDAR 302 as there may be a plurality of degenerate states for a pose of the calibration LiDAR 302 which cause the measurements 306 to localize a wall 312 as illustrated. Accordingly, the systems and methods of the present disclosure illustrated below may enable a robot 102 to determine a pose of the calibration LiDAR 302 despite a plurality of degenerate poses of the calibration LiDAR 302 which may cause the observed measurements 306.

FIG. 4B illustrates a top view of measurements 306 and 308 of a wall 312 from a calibration LiDAR 302 and a reference LiDAR 304, respectively, wherein a pose of a calibration LiDAR 302 has been determined and accounted for by a controller 118 of a robot 102, according to an exemplary embodiment. As illustrated, the measurements 306 and 308 both lie along the Y-axis (i.e., along the axis of the wall 312), thereby minimizing the magnitude of all errors 402. One skilled in the art would appreciate that the measurements 306 and 308 along the wall 312 may not all be located at the same Y coordinate, however the minimum of the errors 402 would be found if the localization of the wall 312, illustrated by the position of measurements 306 and 308, is determined to be at the same X-axis location based on measurements from both the calibration LiDAR 302 and the reference LiDAR 304.

As used here on out, an error measurement 406 may comprise an $L_1$ error measurement 406 calculation using the following equation 1:

$$[\text{Error Measurement}] = \Sigma_{i=1}^{I} |E_i| \qquad \text{(Eqn. 1)}$$

The value of $|E_i|$ may correspond to the magnitude of the errors 402 and index I may correspond to the total number of errors 402 measured between the measurement 306 and their neighboring two, or in some embodiments three or more, closest measurements 308. According to equation 1, an error measurement 406 comprises a sum of the magnitudes of all of the errors 402 detected between measurements 306 and 308 taken within a selection threshold 310, illustrated in FIG. 3 above. One skilled in the art would appreciate that a minimum value for an error measurement 406 may be calculated when the calibration LiDAR 302 and reference LiDAR 304 localize the wall 312 at the same location along the axis of the wall (i.e., the Y-axis), as illustrated in FIG. 4B.

According to some non-limiting exemplary embodiments, other error measurement 406 calculations may be utilized such as, for example, $L_2$, RMS, and the like, wherein use of $L_1$ error is intended to be illustrative and non-limiting.

FIG. 4C illustrates a data table 404 comprising a plurality of calibration LiDAR measurements 306 and reference LiDAR measurements 308 stored in memory 120 of a robot 102, according to an exemplary embodiment. Calibration LiDAR and reference LiDAR measurements 306 and 308 may comprise localization parameters of a wall 312 nearby the robot 102 based on positional coordinates (x, y, z). Upon imposing a selection threshold 310, a plurality of data entries in the table 404 may be removed during calculation of an error measurement 406, as illustrated by some entries being shaded in grey. Four (4) calibration LiDAR measurements 306 may have been determined by a controller 118 of the robot 102 to lie within the selection threshold 310 range. Accordingly, the four (4) measurements 306 and five (5) neighboring reference LiDAR measurements 308 may be kept within the data table 404. Data table 404 further comprises an error column containing values for errors $E_i$ between a measurement 306 and its neighboring two measurements 308, wherein each square root calculation may correspond to an error 402 illustrated above in FIG. 4A-B. Each error $E_i$ may be calculated based on a Euclidian distance calculation between each measurement 306 and its closest two neighboring measurements 308 projected onto a measurement plane of the reference LiDAR 304, wherein the measurement plane of the reference LiDAR 304 in this embodiment is the X-Y plane. Additionally, points generated by both LiDARs 302, 304 may include different z-axis values even when both LiDARs 302, 304 are in their default poses, thus the z-axis measurements may be omitted in the error calculation. Errors three through six ($E_3$-$E_6$), comprising errors 402 measured between measurements 306 which fall within the selection threshold 310 and their closest two neighboring measurements 308, may be used to determine the error measurement 406 based on equation 1 above.

All of the calibration LiDAR measurements are defined with respect to a local sensor origin 210. The local sensor origin 210 may be defined with respect to a robot 102 centric origin using a mathematical transform comprising of rotations/translations. This transform may be utilized by the controller 118 of the robot 102 to translate the locations of points 204, defined locally from calibration origin 210 of the calibration LiDAR, into locations of points 204 defined about the robot centric origin. The transform may be stored in memory 120 based on the current pose of the LiDAR. Controller 118 may utilize similar transforms for all LiDAR sensors on the robot 102 in order to define all of the collected points 204 from the LiDAR sensors with respect to a singular origin. To minimize the error measurements, controller 118 may digitally adjust the pose of the origin 210 of the calibration LiDAR 302 to cause the points 306 measured by the calibration LiDAR to move their (x, y) locations, thereby changing the error measurement. To illustrate using the surfaces 312 shown in FIG. 4A(iii), controller 118 may rotate the origin 210 of the calibration LiDAR 302 to cause the points 306 to align with the points 308, thereby causing the dashed line and solid line of surface 312 to agree. In FIG. 4A(i), the origin 210 may be shifted along the x-axis to align points 306 with points 308. The rotations/translations performed on the origin 210 may translate to errors in the pose of the calibration LiDAR 302. For example, if digitally rotating the origin 210 of the calibration LiDAR 302 by 10° causes the error measurements to minimize, the calibration LiDAR 302 may be misaligned from its default position by 10°.

According to at least one non-limiting exemplary embodiment, each measurement 306, 308 may be associated with an identification, such as a beam ID, timestamp, etc. Since the calibration LiDAR 302 and reference LiDAR 304 are configured to intersect, it should be expected that one or two specific beams from the calibration LiDAR 302 should intersect with one or two specific beams of the reference LiDAR 304. Different beams of the calibration LiDAR 302 intersecting with the one or two specified beams of the reference LiDAR 304 may yield additional pose information, such as z-axis information in the above embodiment.

One skilled in the art would appreciate table 404 may be illustrative of a self-referential data table, wherein rows and/or columns may be added and/or removed as a robot 102 collects more scans at different discrete instances in time and/or as a controller 118 executes computer readable instructions in a memory 120 of the robot 102. Additionally, one skilled in the art would appreciate the X-Y plane of which the measurements 306 and 308 are projected upon to calculate errors 402 may be orientated along any measurement plane of a reference LiDAR 304.

Figure 5:
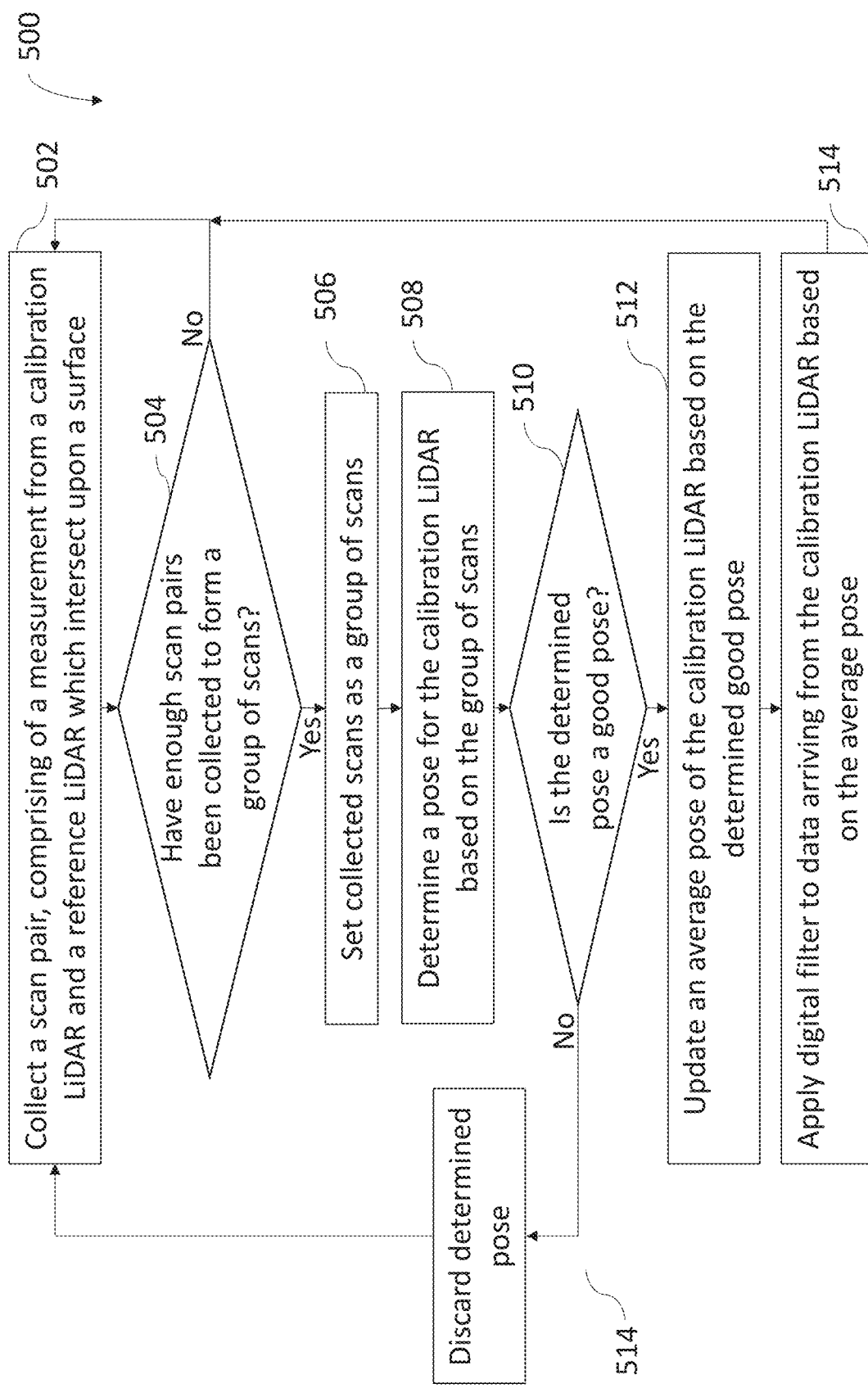
FIG. 5 is a process flow diagram illustrating a method for updating an average pose used to calibrate a calibration LiDAR, according to an exemplary embodiment.

FIG. 5 illustrates a method 500 for a controller 118 of a robot 102 to determine and/or update an average pose of a calibration LiDAR 302 based on a plurality of measurements from the calibration LiDAR 302 and a reference LiDAR 304, according to an exemplary embodiment. The average pose may be utilized by the controller 118 to calibrate the calibration LiDAR 302 by adjusting measurements from the calibration LiDAR 302 based on the average pose.

Block 502 illustrates the controller 118 collecting a scan comprising measurements from the calibration LiDAR 302 and the reference LiDAR 304. A scan may comprise a measurement from the calibration LiDAR 302 and reference LiDAR 304 across their respective fields of view of a surface, such as a wall 312 illustrated above in FIG. 3.

Block 504 illustrates the controller 118 determining if enough scans have been collected to form a group of scans. A group threshold may be imposed to determine the number of scans which may comprise a group of scans. The group threshold may comprise any number of scans (e.g., 10, 15, 100, etc. scans per group).

According to at least one non-limiting exemplary embodiment, the group threshold may comprise a minimum number and a maximum number of scans within a group of scans to account for a robot 102 moving beyond a surface and no longer collecting scans of the surface. Accordingly, if the number of scans of the surface exceeds the minimum threshold, a group of scans may be formed from the remaining scans of the surface. If the number of scans of the surface does not exceed the minimum, the controller 118 may discard the remaining scans and start collecting more scans upon navigating nearby a new surface, as illustrated below in FIG. 8.

Upon the controller 118 determining enough scans may form a group of scans, the controller 118 moves to block 506.

Upon the controller 118 determining not enough scans have been collected to form a group of scans, the controller 118 moves back to block 502 to collect more scans.

Block 506 illustrates the controller setting the collected scans as a group of scans. The group of scans may comprise an array, matrix, or similar data structure of measurement data from the calibration and reference LiDARs stored in memory 120 of the robot 102. The scan data stored in memory 120 may comprise measurements from the calibration LiDAR which fall within a selection threshold 310 of a measurement plane of the reference LiDAR.

Block 508 illustrates the controller 118 determining a pose for the group of scans. The pose may be determined based on a minimization of an error measurement 406 calculated above using equation 1. The method for determining a pose for the group of scans as well as determining if the pose comprises a good pose is further illustrated in method 600 of FIG. 6 below.

Block 510 illustrates the controller 118 determining if the determined pose is a good pose. The determination of a good pose is based on a specification threshold, illustrated below in FIG. 6.

Upon the controller 118 determining the pose comprises a good pose, the controller 118 moves to block 512.

Upon the controller 118 determining the pose does not comprise a good pose, the controller 118 moves to block 514 to discard the determined pose and subsequently return to block 502 to begin collecting a new group of scans.

Block 512 illustrates the controller 118 updating the average pose based on the determined pose, determined to be a good pose of the calibration LiDAR 302 in block 510. The average pose may comprise an average of a plurality of poses calculated based on prior groups of scans collected, wherein the average pose is updated upon the controller 118 determining a new good pose in block 510.

According to at least one non-limiting exemplary embodiment, upon initialization of a robot 102, an average pose may comprise NULL values for its orientation (yaw, pitch, roll) or translation (x, y, z) position, wherein a first pose determined from a first group of scans may be set as the average pose. According to another non-limiting exemplary embodiment, upon initialization of a robot 102, an average pose may comprise a pose of a well calibrated calibration LiDAR determined during manufacturing of the robot 102.

Figure 6:
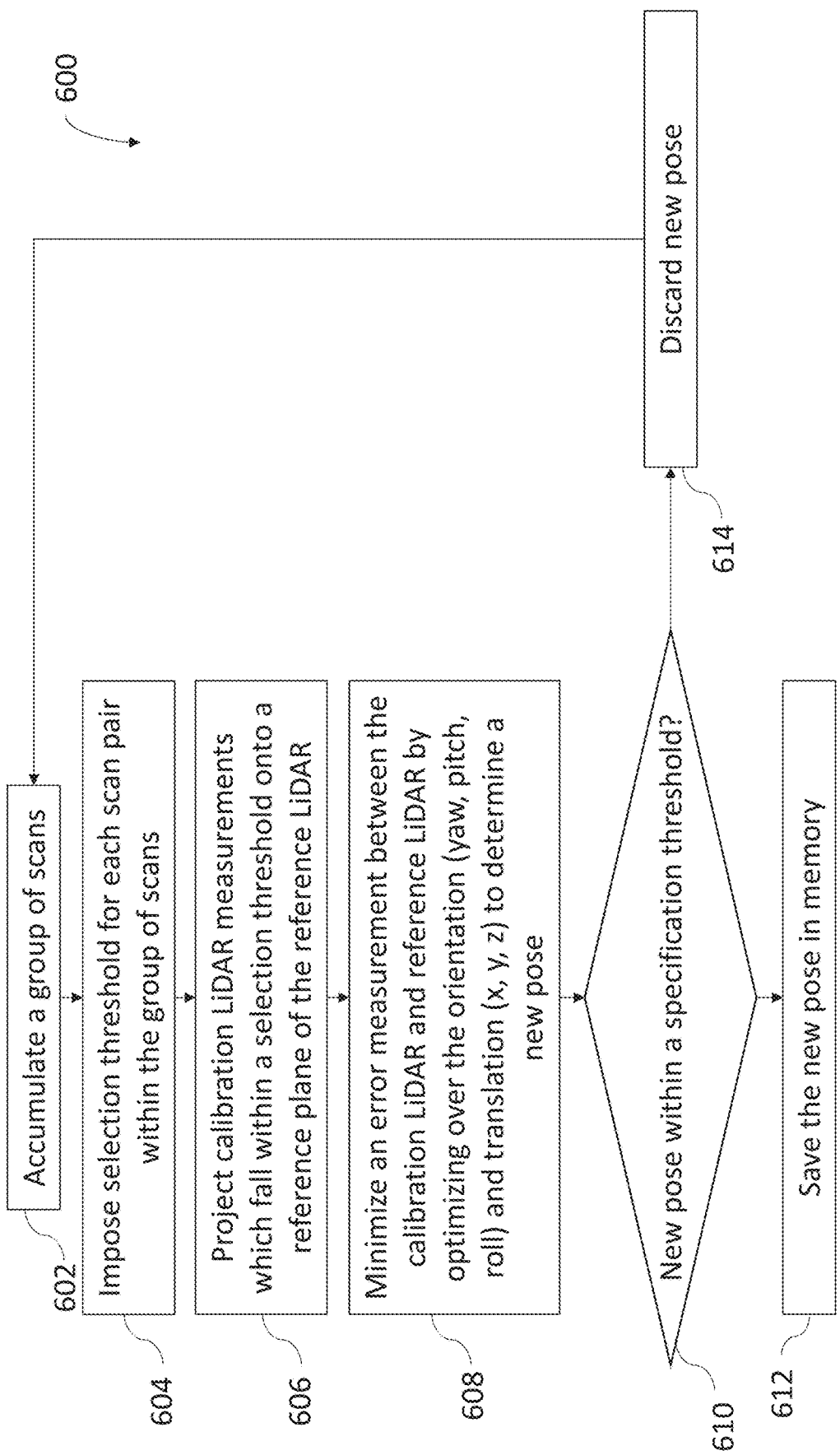
FIG. 6 is a process flow diagram illustrating a method for determining a pose of a calibration LiDAR using data from a group of scans, according to an exemplary embodiment.

FIG. 6 illustrates a method 600 for a controller 118 of a robot 102 to determine a good pose based on a group of scans, according to a non-limiting exemplary embodiment. The good pose determined based on the group of scans may be utilized by the controller 118 to update an average pose of the calibration LiDAR 302. Both calibration LiDAR 302 and reference LiDAR 304 may comprise planar lidars measuring distance measurements along a plane.

Block 602 illustrates the controller 118 accumulating a group of scans. The group of scans may comprise a plurality of scans from the calibration LiDAR 302 and reference LiDAR 304 of a surface, such as wall 312 illustrated in FIG. 3. The number of scans within a group may be determined by a group threshold set by the controller 118 or specified by an operator of the robot 102.

Block 604 illustrates the controller 118 imposing a selection threshold 310 for each scan within the group of scans. The selection threshold 310, illustrated in FIG. 3, may comprise a small deviation (e.g., +1 centimeters, ±3 centimeters, etc.) along a measurement plane of the reference LiDAR 304. The selection threshold 310 may be imposed by the controller 118 to ensure measurements 306 of the calibration LiDAR 302 within the selection threshold 310 are measurements of a substantially flat surface (i.e., no bumps or features of the surface which may cause localization of the surface to vary).

Block 606 illustrates the controller 118 projecting the remaining calibration LiDAR measurements 306 onto the measurement plane of the reference LiDAR 304. According to at least one non-limiting exemplary embodiment, a calibration LiDAR 302 may comprise a 3D lidar wherein a controller 118 may project measurements 306 of the 3D calibration LiDAR 302 onto a measurement plane of a planar reference LiDAR 304. According to at least one non-limiting exemplary embodiment, a reference LiDAR 304 may comprise a 3D LiDAR wherein a controller 118 may project measurements 306 of the calibration LiDAR 302 onto one or more measurement planes of the 3D reference LiDAR 304.

Block 608 illustrates the controller 118 utilizing a minimizer 706, illustrated below in FIG. 7, to minimize an error measurement 406, determined by equation 1 above, between measurements 306 and their neighboring measurements 308 from the calibration LiDAR 302 and reference LiDAR 304, respectively, by optimizing over the orientation (yaw, pitch, roll) and translation (x, y, z) to determine a new pose. The minimizer 706 may be configurable to determine a pose of the calibration LiDAR 302 which minimizes the error measurement 406 determined by equation 1 above.

Block 610 illustrates the controller 118 determining if the new pose is within a specification threshold. A pose within the specification threshold may be determined to be a good pose to be used to update an average pose of the calibration LiDAR 302. The specification threshold may comprise maximum error for any orientation (yaw, pitch, roll) and translation (x, y, z) value. Imposing the specification threshold may enable the controller 118 to determine if the new pose calculated by the minimizer 706 is an outlier pose, wherein an outlier pose may comprise a pose of the calibration LiDAR 302 which may not be plausible. For example, a specification threshold may impose threshold yaw, pitch, and roll values of a new pose must not exceed 20° of a calibrated or default pose of the calibration LiDAR as it may not be possible for the calibration LiDAR 302 to exceed a 20° error in its orientation coordinates (yaw, pitch, roll) due to physical constraints such as a mounting (e.g., screws, bolts, etc.) which attach the calibration LiDAR 302 to the robot 102. The minimizer 706 may determine a minimum of the error measurement 406 lies outside a plausible range of orientation (yaw, pitch, roll) and translation (x, y, z) values due to physical constraints of the calibration LiDAR 302 and/or how the calibration LiDAR 302 is mounted onto the robot 102. In other words, the specification threshold may set bounds for the yaw, pitch, roll, x position, y position, and z position of the calibration LiDAR for the minimizer 706 based on reasonable physical constraints.

One skilled in the art would appreciate a robot 102 may navigate nearby walls with uneven surfaces or slanted surfaces which may cause a minimizer 706 to output a pose of a calibration LiDAR 302 to exceed a specification threshold. Advantageously, the use of a specification threshold may enhance the accuracy of an average pose of the calibration LiDAR 304 by discarding calculated poses which may be outlier poses such as, for example, due to uneven or slanted surfaces of which groups of scans are measured upon.

Upon the controller 118 determining the new pose is within the specification threshold, the controller 118 moves to block 612.

Upon the controller 118 determining the new pose is not within the specification threshold, the controller 118 moves to block 614 to discard the new pose.

Block 612 illustrates the controller 118 saving the new pose in memory 120. The new pose may be utilized to update the average pose based on an average between the new pose and a plurality of other poses calculated from prior groups of scans.

Figure 7A:
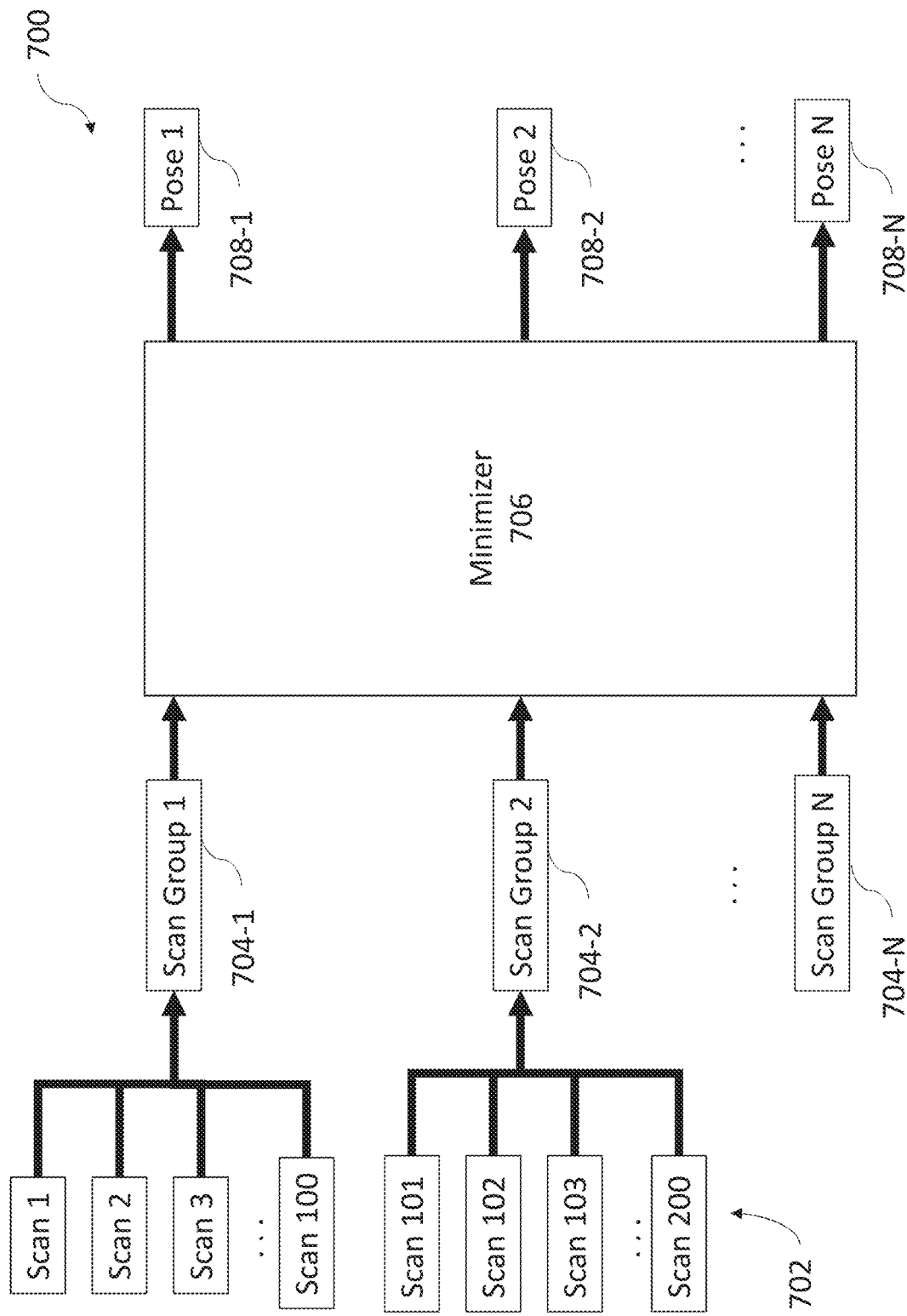
FIG. 7A-B illustrates a system configurable to determine an average pose based on individual scans of a calibration LiDAR and reference LiDAR to be used to calibrate the calibration LiDAR, according to an exemplary embodiment.

FIG. 7A is a functional block diagram of a system 700 configurable to determine a plurality of poses 708 of a calibration LiDAR 302 based on scans 702 collected by the calibration LiDAR 302 and a reference LiDAR 304, according to a non-limiting exemplary embodiment.

Scan 702 may comprise calibration LiDAR 302 measurements 306 within a selection threshold 310, determined by a deviation from a measurement plane of the reference LiDAR 304. Each scan 702 may be taken at discrete intervals in time and may be accumulated into scan groups 704. Scan groups 704 comprise a plurality of scans 702 to be utilized by a minimizer 706 to determine a pose of the calibration LiDAR 302 based on the scan groups 704. Scan groups 704 may comprise, for example, one hundred (100) scans 702. According to at least one non-limiting exemplary embodiment, a scan groups 704 may comprise more or fewer than one hundred (100) scans 702. According to at least one non-limiting exemplary embodiment, each scan group 704 may comprise the same number or different number of scans 702 as other scan groups 704.

Minimizer 706 is configurable to minimize an error measurement 406, determined by equation 1 above, of each scan group 704 utilizing specialized algorithms stored in memory 120 of a robot 102. These algorithms may include, for example, Broyden-Fletcher-Goldfarb-Shanno (BFGS) algorithms, low memory BFGS algorithms, constrained optimization by linear approximation (COBYLA) algorithms, sequential quadratic programming (SQP), and/or other similar optimization algorithms configurable to minimize the error measurement 406 by determining a pose of the calibration LiDAR 302. Minimizer 706 may determine a pose 708 based on the scans 702 within a scan group 704, wherein the pose 708 may be the pose of the calibration LiDAR 302 such that the error measurement 406 is at a minimum. Minimizer 706 may be a separate operative unit of the robot 102 or may be illustrative of the controller 118 executing computer readable instructions in memory 120. Over time, the minimizer 706 may output a plurality of poses 708 as the robot 102 collects additional scans 702. The plurality of poses 708 may be used by the controller 118 to determine an average pose 714 using a system 710 illustrated below in FIG. 7B.

Figure 7B:
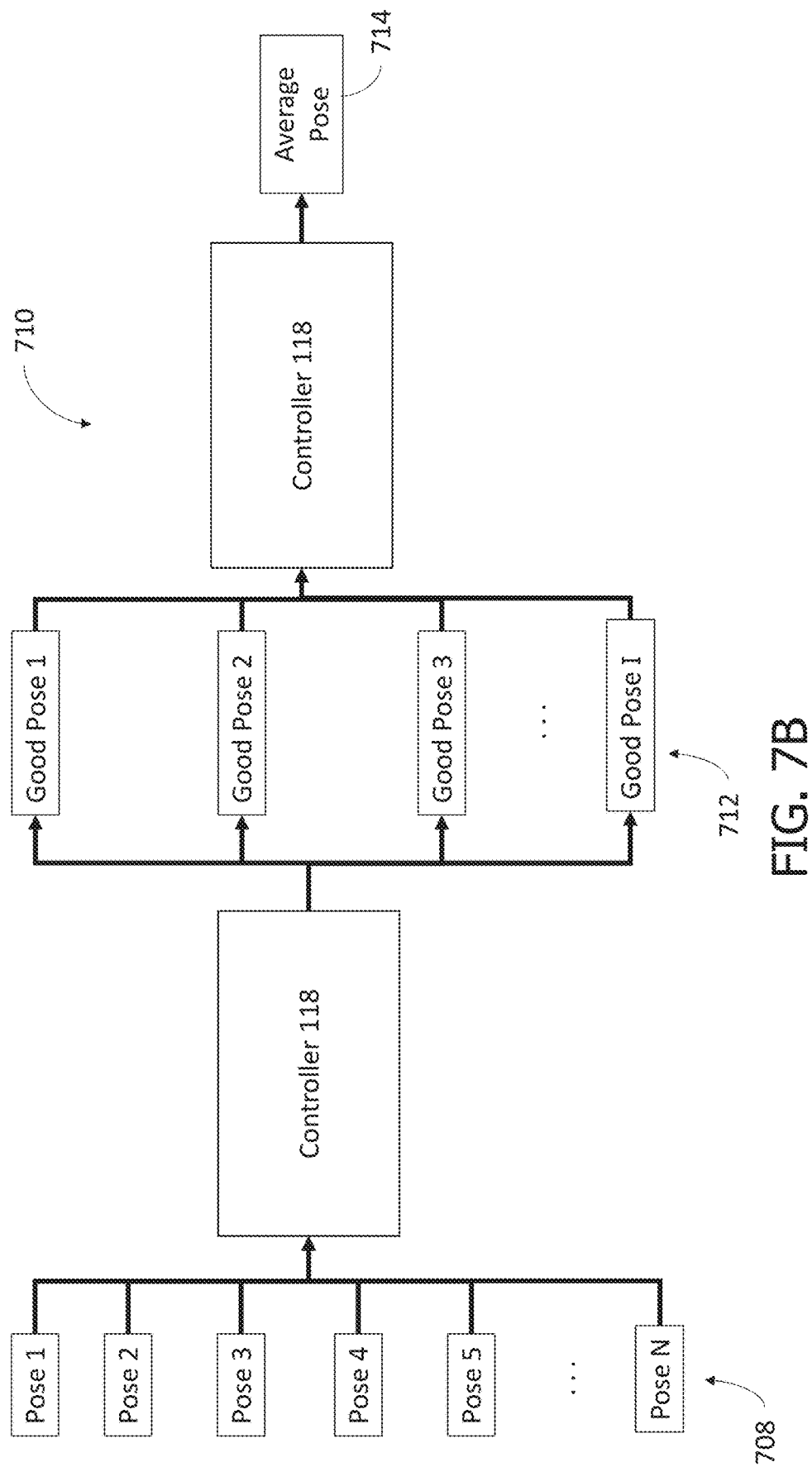

FIG. 7B illustrates a system 710 configurable to determine an average pose 714 based on a plurality of poses 708 determined by a system 700 illustrated above in FIG. 7A, according to an exemplary embodiment. The average pose 714 may be a best pose estimate of the calibration LiDAR 302 used to enhance the ability of the controller 118 to adjust data arriving from the calibration LiDAR 302 to account for the determined average pose such that data arriving from the calibration LiDAR 302 may be substantially similar to data arriving from a perfectly calibrated calibration LiDAR 302.

A controller 118 of a robot 102 may receive a plurality of poses 708 from a minimizer 706, illustrated above in FIG. 7A, and determine good poses 712 from the plurality of poses 708. A good pose 712 may be a pose 708 which does not exceed a specification threshold, illustrated above in FIG. 6. The specification threshold may be threshold value for each orientation (yaw, pitch, roll) and translation (x, y, z) coordinate value, wherein a pose 708 comprising a coordinate value exceeding the specification threshold may be discarded due to the pose being outside of physical constraints of the calibration LiDAR 302 (e.g., roll cannot exceed 10° of a perfectly calibrated calibration LiDAR 302 pose due to mounting of the calibration LiDAR 302). The controller 118 may receive N poses 708 from the minimizer 706 and output I good poses 712 meeting the specification threshold, wherein indices N and I correspond to integer numbers of poses 708 received and good poses 712 outputted, respectively, by the controller 118 and N is larger than or equal to I. The plurality of good poses 712 may be averaged by the controller 118 to determine an average pose 714. Each coordinate value (e.g., yaw, pitch roll, x, y, and z) of the average pose 714 may comprise an average of the respective coordinate value of all good poses 712 determined by the controller 118. The average pose 714 may be utilized by the controller 118 to adjust sensor data from the calibration LiDAR based on the average pose 714 of the calibration LiDAR 302.

According to at least one non-limiting exemplary embodiment, a calibration LiDAR 302 may be fitted with servomotors configurable to adjust the orientation and position of the calibration LiDAR 302 based on an average pose 714. A controller 118 may activate the servomotors to reposition the calibration LiDAR 302 such that the calibration LiDAR 302 is in its calibrated orientation and position.

According to another non-limiting exemplary embodiment, data from a calibration LiDAR 302 may be modified based on a determined average pose 714 using a digital filter. For example, an average pose may include the calibration LiDAR 302 being at a pitch angle differing from a calibrated value, wherein data from the calibration LiDAR 302 is modified to account for the pitch of the average pose by the digital filter. The digital filter may comprise a spatial transformation of data (i.e., localized points) received by the calibration LiDAR 302.

Figure 8:
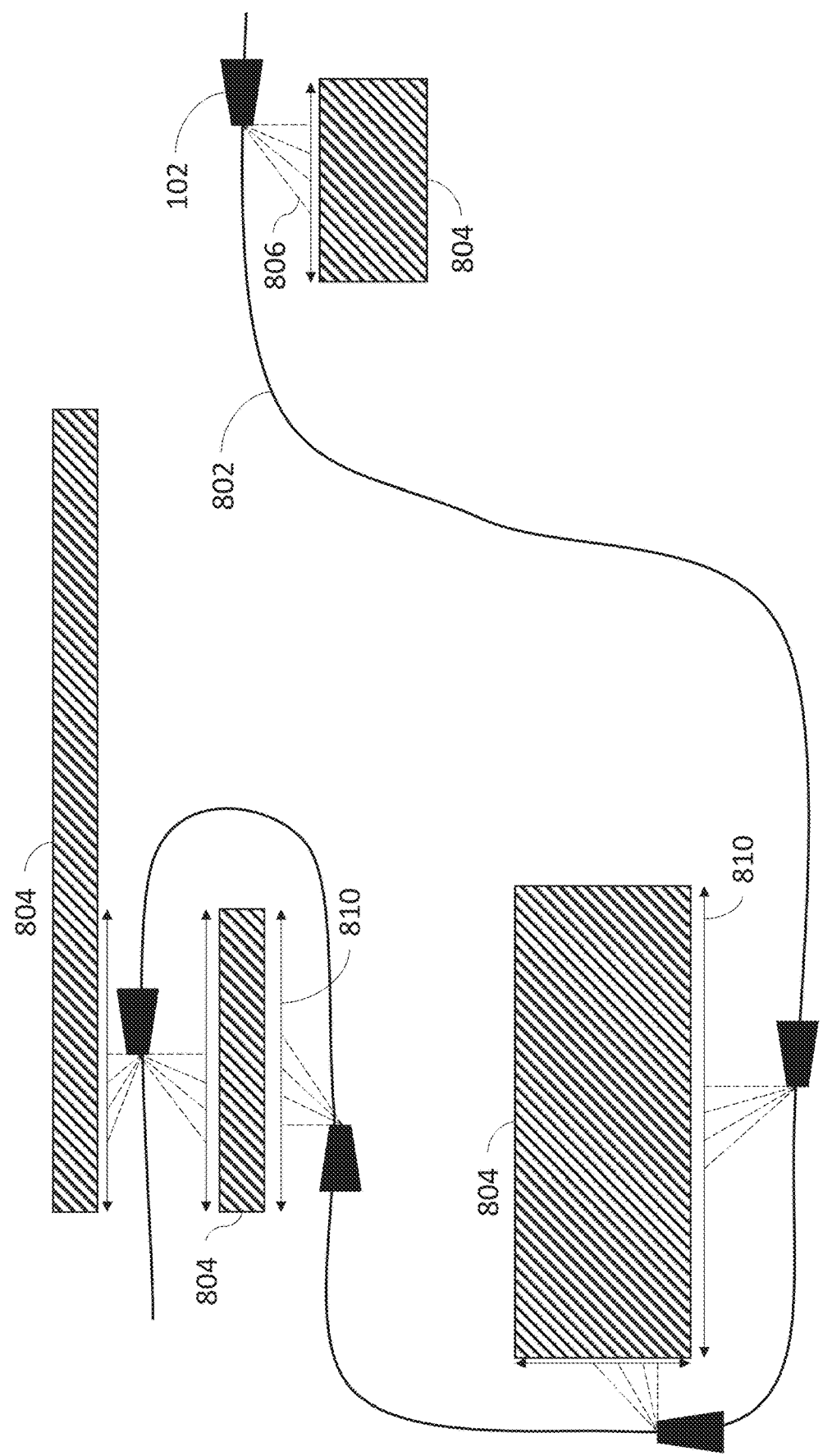
FIG. 8 is a top view of a robot navigating nearby surfaces to collect scan data to be used to determine a pose of a calibration LiDAR, according to an exemplary embodiment.

FIG. 8 illustrates a robot 102 navigating along a route 802 while collecting a plurality of scans, illustrated by sensor vision lines 806, according to a non-limiting exemplary embodiment. The robot 102 may determine the route 802 based on an assigned task to perform assigned by an operator of the robot 102. As the robot 102 navigates the route 802 it comes within close proximity of a plurality of environmental objects 804. Environmental objects 804 may comprise, for example, shelves within a store or other static objects within an environment. Sensor vision lines 806 may be illustrative of the robot 102 collecting distance measurements from a calibration LiDAR 302 and a reference LiDAR 304. The robot 102 may collect a plurality of scans as it navigates nearby objects 804, wherein the plurality of scans are taken along surfaces 810 of the objects 802.

As illustrated, scans are taken on both sides of the robot 102 based on the location of the objects 802 relative to the robot 102 as the robot 102 navigates along route 802. Additionally, some scans may be taken on both sides of the robot 102 simultaneously. Collecting scan data from both sides of the robot 102 may further enhance the ability of the controller 118 to determine a pose of the calibration LiDAR 302 as the controller 118 is provided with additional surfaces 810 to collect scan data from. A robot 102 may determine a scan group 704 based on the number of scans collected as it navigates nearby an object 804, wherein a scan group 704 may comprise varying number of scans depending on the length of a surface 810 of which the robot 102 collects the scan data from.

One skilled in the art would appreciate that the systems and methods of the present disclosure for determining a pose of a calibration LiDAR 302 may be utilized as the robot 102 performs other tasks and navigates nearby objects 804. A robot 102 may determine an average pose of a calibration LiDAR 302 by navigating nearby objects 804 for the purpose of calibrating the calibration LiDAR 302. Additionally, a robot 102 collecting scan data from a plurality of surfaces 810 of objects 802 on both sides of the robot 102 may further enhance the accuracy of a determined average pose of a calibration LiDAR 302.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A non-transitory computer readable storage medium comprising computer readable instructions stored thereon, the computer readable instructions, when executed by at least one processor, causes the at least one processor to:
   collect a group of scans using a calibration LiDAR and a reference LiDAR, the group of scans comprising a plurality of scans of a surface from both the calibration LiDAR and the reference LiDAR;
   determine a pose of the calibration LiDAR based on the group of scans; and
   adjust the calibration LiDAR based on an average pose, the average pose determined based on an average of a plurality of determined poses of the calibration LiDAR, wherein at least one measurement plane of the calibration LiDAR and the reference LiDAR intersect upon the surface.

2. The non-transitory computer readable storage medium of claim 1, wherein the at least one processor is further configured to execute the computer readable instructions to:
   impose a selection threshold orthogonal to a measurement plane of the reference LiDAR; and
   impose a specification threshold to determine if a determined pose comprises a good pose.

3. The non-transitory computer readable storage medium of claim 1, wherein the at least one processor is further configured to execute the computer readable instructions to:
   determine the pose of the calibration LiDAR based on minimizing an error measurement calculation.

4. The non-transitory computer readable storage medium of claim 1, wherein the surface includes a vertical wall.

5. The non-transitory computer readable storage medium of claim 1, wherein the at least one processor is further configured to execute the computer readable instructions to:
digitally adjust data arriving from the calibration LiDAR based on a difference between the pose and a default pose of the calibration LiDAR.

6. A robotic system, comprising:
a non-transitory computer readable medium comprising computer readable instructions stored thereon; and
at least one processor configured to execute the computer readable instructions to:
collect a group of scans using a calibration LiDAR and a reference LiDAR positioned on the robotic system, the group of scans comprising a plurality of scans of a surface from both the calibration LiDAR and reference LiDAR;
determine a pose of the calibration LiDAR based on the group of scans; and
adjust the calibration LiDAR based on an average pose, the average pose determined based on an average of a plurality of determined poses of the calibration LiDAR,
wherein at least one measurement plane of the calibration LiDAR and reference LiDAR intersect upon the surface.

7. The robotic system of claim 6, wherein the at least one processor is further configured to execute the computer readable instructions to:
impose a selection threshold orthogonal to a measurement plane of the reference LiDAR; and
impose a specification threshold to determine if a determined pose comprises a good pose.

8. The robotic system of claim 6, wherein the at least one processor is further configured to execute the computer readable instructions to:
determine the pose of the calibration LiDAR based on minimizing an error measurement calculation.

9. The robotic system of claim 6, wherein the surface is a vertical wall.

10. The robotic system of claim 6, wherein the at least one processor is further configured to execute the computer readable instructions to:
digitally adjust data arriving from the calibration LiDAR based on a difference between the pose and a default pose of the calibration LiDAR.

11. A method, comprising:
collecting a group of scans using a calibration LiDAR and a reference LiDAR, the group of scans comprising a plurality of scans of a surface from both the calibration LiDAR and the reference LiDAR;
determining a pose of the calibration LiDAR based on the group of scans; and
adjusting the calibration LiDAR based on an average pose, the average pose determined based on an average of a plurality of determined poses of the calibration LiDAR,
wherein at least one measurement plane of the calibration LiDAR and the reference LiDAR intersect upon the surface.

12. The method of claim 11, further comprising:
imposing a selection threshold orthogonal to a measurement plane of the reference LiDAR; and
imposing a specification threshold to determine if a determined pose comprises a good pose.

13. The method of claim 11, further comprising:
determining the pose of the calibration LiDAR based on minimizing an error measurement calculation.

14. The method of claim 11, wherein the surface includes a vertical wall.

15. The method of claim 11, further comprising:
digitally adjust data arriving from the calibration LiDAR based on a difference between the pose and a default pose of the calibration LiDAR.

\* \* \* \* \*